July 21, 1936.  S. MIGLIORINI  2,048,019
ANTISKID DEVICE
Filed Nov. 20, 1934
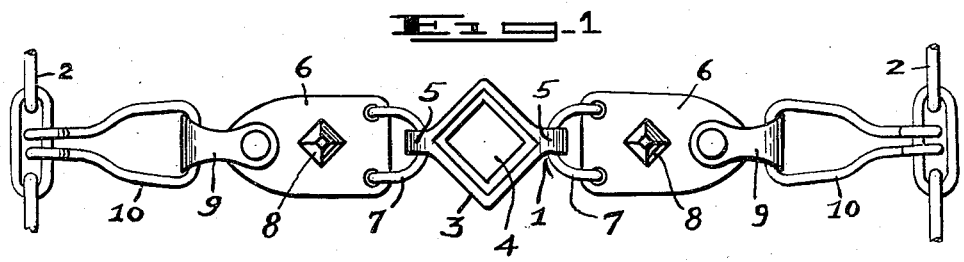
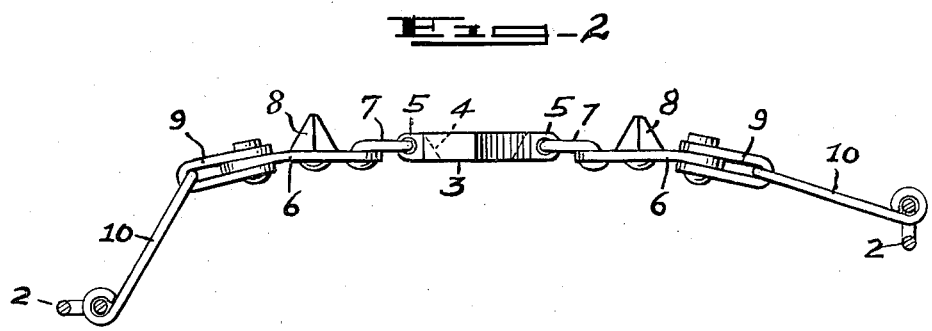

Patented July 21, 1936

2,048,019

UNITED STATES PATENT OFFICE 2,048,019

ANTISKID DEVICE

Samuel Migliorini, Bridgeville, Pa.

Application November 20, 1934, Serial No. 753,850

1 Claim. (Cl. 152—14)

My invention relates to an anti-skid device for motor vehicle wheels, and important objects thereof are to provide a device of the character described, which will assure positive traction for and prevent the skidding of motor vehicle wheels equipped therewith, which is simple in its construction and arrangement, durable and efficient in its use, attractive in appearance, and comparatively inexpensive to manufacture.

With the foregoing and other objects in view which will appear as the description proceeds, the invention consists of the novel construction, combination and arrangement of parts herein specifically described and illustrated in the accompanying drawing, but it is to be understood that changes in the form, proportions and details of construction may be resorted to that come within the scope of the claims hereunto appended.

In the drawing wherein like numerals of reference designate corresponding parts throughout the several views:

Figure 1 is a top plan view of an anti-skid cross-chain constructed in accordance with the present invention.

Figure 2 is a side view thereof.

The present invention is entirely embodied in the novel construction and arrangement of the cross-chain 1. A plurality of the latter are mounted to extend transversely across the tread of a wheel tire and secured in position by the pair of parallel extending side chains 2, in the usual manner well known in the art to which the invention appertains.

The cross-chain 1 comprises a rectangularly-shaped center block 3 provided with a correspondingly shaped opening 4. The latter extends through the center block and has bevelled side walls increasing the area thereof toward the top of the center block, so as to minimize the liability of any extraneous matter lodging therein. The center block is provided with a pair of integrally formed connecting lugs 5, which are apertured and disposed at diagonally opposed corners of the former.

A pair of flat tread plates 6 is disposed at respective sides of the center block 3. Each of the tread plates is joined to respective connecting lugs 5 by a link 7, which passes through the connecting lug and connects with the inner end of the tread plate. Each of the tread plates carries a tapered traction cleat 8, which may be secured to the former in any suitable manner. The traction cleats are preferably square in transverse cross section, and function to afford traction and to prevent skidding.

The outer end of the traction plate 6 is reduced in width and curved downwardly. A clevis 9 joins the outer end of the traction plate with a connecting link 10, which latter connects with the respective side chain 2. The curvature of the traction plates, in conjunction with the connections of the various elements of the structure, in the manner described, provides a flexible cross-chain that will readily conform to the transverse curvature of the tire equipped therewith.

The present invention provides a most efficient device of its kind for preventing skidding and for effectively providing traction.

What I claim is:

An anti-skid cross-chain of the character described comprising, the combination of a rectangularly-shaped center block provided with a correspondingly shaped opening having beveled side walls gradually increasing the area of said opening toward the top thereof, a pair of connecting lugs formed integral with said center block and located at diagonally opposed corners of the latter, a pair of tread plates, the outer end portions of said pair of tread plates being reduced in width and curved to depend inwardly, a link joining with each of said pair of connecting lugs and with the inner end corners of respective tread plates, a tapered traction cleat secured to each of said pair of tread plates, said traction cleats being square in transverse cross section and disposed to extend diagonally on respective tread plates, a clevis pivotally connected to the depending outer ends of respective tread plates, and a connecting member joined with each of said clevises.

SAMUEL MIGLIORINI.